US012272890B2

(12) United States Patent
Chen et al.

(10) Patent No.: US 12,272,890 B2
(45) Date of Patent: Apr. 8, 2025

(54) SOCKET STRENGTHENER, BOARD-TO-BOARD SOCKET, AND BOARD-TO-BOARD CONNECTOR ASSEMBLY

(71) Applicant: SHENZHEN EVERWIN PRECISION TECHNOLOGY CO., LTD., Guangdong (CN)

(72) Inventors: Xiaoshuo Chen, Guangdong (CN); Yiping Shi, Guangdong (CN)

(73) Assignee: SHENZHEN EVERWIN PRECISION TECHNOLOGY CO., LTD., Guangdong (CN)

( * ) Notice: Subject to any disclaimer, the term of this patent is extended or adjusted under 35 U.S.C. 154(b) by 338 days.

(21) Appl. No.: 17/787,678

(22) PCT Filed: Dec. 31, 2020

(86) PCT No.: PCT/CN2020/141930
§ 371 (c)(1),
(2) Date: Jun. 21, 2022

(87) PCT Pub. No.: WO2021/248894
PCT Pub. Date: Dec. 16, 2021

(65) Prior Publication Data

US 2023/0009513 A1 Jan. 12, 2023

(30) Foreign Application Priority Data

Jun. 8, 2020 (CN) ......................... 202010513475.6

(51) Int. Cl.
*H01R 12/71* (2011.01)
*H01R 13/11* (2006.01)
(Continued)

(52) U.S. Cl.
CPC ........... *H01R 12/716* (2013.01); *H01R 13/11* (2013.01); *H01R 13/46* (2013.01); *H01R 13/5213* (2013.01)

(58) Field of Classification Search
CPC .................................................... H01R 13/639
See application file for complete search history.

(56) References Cited

U.S. PATENT DOCUMENTS

2016/0268732 A1* 9/2016 Arichika ............ H01R 13/6271
2019/0181572 A1 6/2019 Ono

FOREIGN PATENT DOCUMENTS

CN 200950495 Y 9/2007
CN 110571555 A 12/2019
(Continued)

OTHER PUBLICATIONS

International Search Report from International Application No. PCT/CN2020/141930 mailed Apr. 6, 2021.
(Continued)

*Primary Examiner* — Abdullah A Riyami
*Assistant Examiner* — Amara Anderson
(74) *Attorney, Agent, or Firm* — W&G Law Group

(57) ABSTRACT

A socket strengthener, a board-to-board socket, and a board-to-board connector assembly. The socket strengthener (60) comprises a main body part (61), top surface cover parts (66) and lateral outer peripheral wall cover parts (64) formed by extending from the main body part (61), elastic arm parts (65) curving backwards from the ends of the lateral outer peripheral wall cover parts (64) and extending to the inner sides of the lateral outer peripheral wall cover parts (64). The top surface cover parts (66), on the sides adjacent to the elastic arm parts (65) bend downward to form guide parts (662).

20 Claims, 11 Drawing Sheets

(51) Int. Cl.
*H01R 13/46* (2006.01)
*H01R 13/52* (2006.01)

(56) References Cited

FOREIGN PATENT DOCUMENTS

| | | | |
|---|---|---|---|
| CN | 110896181 | A | 3/2020 |
| CN | 111082238 | A | 4/2020 |
| CN | 210576570 | U | 5/2020 |
| CN | 111740252 | A | 10/2020 |
| CN | 212626148 | U | 2/2021 |
| JP | 2015115200 | A | 6/2015 |
| JP | 2018078072 | A | 5/2018 |
| JP | 2018142456 | A | 9/2018 |
| JP | 2019135726 | A | 8/2019 |

OTHER PUBLICATIONS

First Office Action issued Jun. 13, 2024 in Chinese Patent Application No. 202010513475.6, 9 pp.
Japan Notice of Reasons for Refusal dated Jun. 12, 2023 in JP 2022-564691.

* cited by examiner

SOCKET STRENGTHENER, BOARD-TO-BOARD SOCKET, AND BOARD-TO-BOARD CONNECTOR ASSEMBLY

TECHNICAL FIELD

The present application claims priority to Chinese Patent Application No. 202010513475.6, filed on Jun. 8, 2020 and titled "BOARD-TO-BOARD CONNECTOR ASSEMBLY", the contents of which are incorporated herein by reference in its entirety.

TECHNICAL FIELD

The present application relates to the field of connectors, and in particular, to a socket strengthener, a board-to-board socket, and a board-to-board connector assembly.

BACKGROUND

Board-to-board connector assemblies are widely used in the field of consumer electronics, such as smart phones, tablets, and wearable devices. Current smart phones and wearable devices have extremely high requirements on space, with components in reduced sizes. A minimum height of a board-to-board plug of front-line board-to-board manufacturers has reached an ultra-low height of 0.6 mm after fitting with a socket, and a pitch between terminals has reached a distance of 0.25 mm. Such a tiny connector puts forward a high requirement on structural strength of the connector. Moreover, compared with conventional board-to-board connector assemblies, large-scale functional integration of existing smart phones puts forward a higher requirement on current carrying capacity. For example, liquid crystal displays require current transfer capacity to be up to 5 A. The design of the conventional board-to-board connector assemblies is incapable of adapting to current market requirements on strength and current transfer.

SUMMARY

In view of the above, there is a need to provide a socket strengthener, a board-to-board socket, and a board-to-board connector assembly to meet the requirements that the product still has good strength and can transfer large current after being lightweight, and prevent damages to the elastic arm parts.

In order to solve the above technical problem, the present application provides a socket strengthener, including a main body part, top surface cover parts and lateral outer peripheral wall cover parts formed by extending from two longitudinal sides of the main body part in a lateral direction, elastic arm parts curving backwards from the ends of the lateral outer peripheral wall cover parts and extending to the inner sides of the lateral outer peripheral wall cover parts, wherein the top surface cover parts, on the side adjacent to the elastic arm parts bend downward to form guide parts, and viewed from top to bottom, the guide parts do not overlap with the elastic arm parts, and the bottoms of the guide parts are lower than the tops of the elastic arm parts.

In order to solve the above technical problem, the present application further provides a board-to-board socket, including a socket body, a socket terminal, and a socket strengthener, the socket body including a bottom wall, socket side walls formed by protruding upward from two longitudinal ends of the bottom wall, socket guide parts formed at two lateral ends of the socket body, and an island part formed by protruding upward from the bottom wall, each of the socket guide parts including a plug guide part receiving cavity, a longitudinal outer peripheral wall located at the lateral outer side of the plug guide part receiving cavity, and a pair of lateral outer peripheral walls located at two longitudinal sides of the plug guide part receiving cavity, the socket strengthener including a main body part covering the surface of the longitudinal outer peripheral wall, top surface cover parts and lateral outer peripheral wall cover parts extending from two longitudinal sides of the main body part along the lateral direction and covering top surfaces and outer side surfaces of the lateral outer peripheral walls, and elastic arm parts extending from the lateral outer peripheral wall cover parts to the side of the lateral outer peripheral walls adjacent to the plug guide part receiving cavity, wherein the top surface cover parts, on the inner side adjacent to the lateral outer peripheral walls bend downward to form guide parts, and viewed from top to bottom, the guide parts do not overlap with the elastic arm parts, and the bottoms of the guide parts are lower than the tops of the elastic arm parts.

In order to solve the above technical problem, the present application further provides a board-to-board connector assembly, including a socket and a plug matched therewith, the plug including a plug body, a plug terminal, and a plug strengthener, the plug body including a top wall, plug side walls formed by extending downwards from two longitudinal ends of the top wall, plug guide parts formed at two lateral ends of the plug body, and an island part receiving cavity located between the plug side walls and the plug guide parts, the socket including a socket body, a socket terminal, and a socket strengthener, the socket body including a bottom wall, socket side walls formed by protruding upward from two longitudinal ends of the bottom wall, socket guide parts formed at two lateral ends of the socket body, an island part formed by protruding upward from the bottom wall, and a plug side wall receiving cavity formed between the island part and the socket side walls, each of the socket guide parts including a plug guide part receiving cavity, a longitudinal outer peripheral wall located at the lateral outer side of the plug guide part receiving cavity, and a pair of lateral outer peripheral walls located at two longitudinal sides of the plug guide part receiving cavity, the socket strengthener including a main body part covering the surface of the longitudinal outer peripheral wall, top surface cover parts and lateral outer peripheral wall cover parts extending from two longitudinal sides of the main body part along the lateral direction and covering top surfaces and outer side surfaces of the lateral outer peripheral walls, and elastic arm parts extending from the lateral outer peripheral wall cover parts to the side of the lateral outer peripheral walls adjacent to the plug guide part receiving cavity, wherein the top surface cover parts, on the inner side adjacent to the lateral outer peripheral walls bend downward to form guide parts, and viewed from top to bottom, the guide parts do not overlap with the elastic arm parts, and the bottoms of the guide parts are lower than the tops of the elastic arm parts.

According to the present application, guide parts are formed by means of a bending downward on the lateral outer side of the top surface cover parts of the socket strengthener, and elastic arm parts are formed by means of a backwards bending of the free ends of the lateral outer peripheral wall cover parts. The elastic arm parts and the guide parts are displaced in lateral directions so as to increase the length by which the guide parts extend downwards, causing the guide parts to be able to protect the elastic main arm throughout the entirety of an insertion process. Besides, the present application has advantages of a simple structure and good mass production.

BRIEF DESCRIPTION OF DRAWINGS

The accompanying drawings illustrated herein are intended to provide further understanding of the present application and form part of the present application, and schematic embodiments of the present application and the descriptions thereof are intended to explain the present application and do not constitute improper limitations on the present application. In the drawings.

DESCRIPTION OF EMBODIMENTS

In order to make the objectives, technical solutions and advantages of the present application clearer, the technical solutions of the present application will be clearly and completely described in conjunction with specific embodiments of the present application and the corresponding accompanying drawings. It is apparent that the embodiments described are merely some rather than all of the embodiments of the present application. All other embodiments obtained by those of ordinary skill in the art based on the embodiments in the present application without creative efforts fall within the protection scope of the present application.

Figure 1:
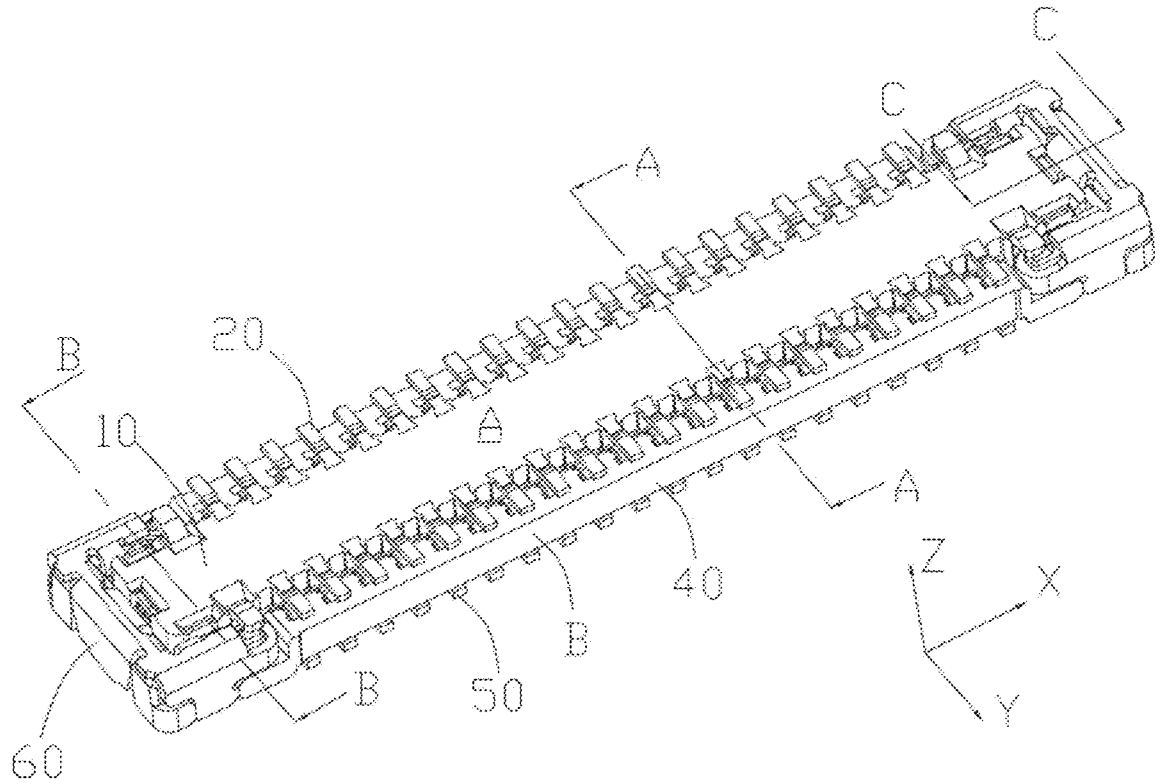
FIG. 1 is an assembled view of a board-to-board connector assembly according to the present application.

Directions defined in the present application are subjected to FIG. 1. Direction X is "right" in a left-right direction (lateral direction), Direction Y is "front" in a front-rear direction (longitudinal direction), and Direction Z is "up" in an up-down direction (vertical direction).

Referring to FIG. 1, a board-to-board connector assembly according to the present application includes a plug A attached to a printed circuit board and a socket B attached to another printed circuit board. The plug A is interlocked with and connected to the socket B.

The plug A includes a plug body 10, several plug terminals 20 formed in the plug body 10, and a plug strengthener 30 fixed to two lateral ends of the plug body 10. The socket B includes a socket body 40, a socket terminal 50 mounted on the socket body 40, and a socket strengthener 60 mounted on and fixed to two lateral ends of the socket body 40.

Referring to FIG. 2 to FIG. 6, the plug body 10 of the plug A includes a top wall 11, a pair of plug side walls 12 formed by extending downward from two longitudinal sides of the top wall 11, plug guide parts 14 formed at two lateral ends of the plug body 10, and an island part receiving cavity 13 formed among the top wall 11, the pair of plug side walls 12, and the plug guide parts 14.

The plug terminals 20 are integrally formed on the pair of plug side walls 12 in two rows in the lateral direction. The plug guide parts 14 each include a bottom surface 141, a longitudinal outer side surface 142, a pair of lateral outer side surfaces 143, and a slope 144 toward the island part receiving cavity 13. The longitudinal outer side surface 142 is provided with a first notch 1421. The lateral outer side surfaces 143 each include two bumps 1431 and 1432 protruding longitudinally, a second notch 1433 located between the two bumps 1431 and 1432, and a third notch 1434 located between the bump 1432 and the plug side wall 12. An inclined plane 1441 upward from the bottom surface 141 to the top wall 11 and an engaging hole 1442 recessed upward from the inclined plane 1441 at the side adjacent to the bottom surface 141 are formed on the slope 144.

The plug strengthener 30 includes a covering base part 31 longitudinally covering the bottom surface 141 of the plug guide part 14, a longitudinal outer side surface cover part 35 and a longitudinal inner side surface cover part 34 formed by bending and extending upward from two lateral ends of the covering base part 31, covering the longitudinal outer side surface 142 and clamped into the engaging hole 1442, and a lateral outer side surface cover part 33 formed by bending and extending upward from two longitudinal ends of the covering base part 31 and covering the lateral outer side surface 143 along the lateral direction. The longitudinal outer side surface cover part 35 is clamped into the first notch 1421.

The lateral outer side surface cover part 33 includes a contact part 331 clamped into the second notch 1433, and a solder pin 332 formed by bending from the top of one end of the lateral outer side surface cover part 33 away from the longitudinal outer side surface cover part 35 to a longitudinal outer side. The contact part 331 of the lateral outer side surface cover part 33 is clamped into the second notch 1433. The solder pin 332 is clamped into the third notch 1434 and then bends vertically toward the longitudinal outer side. The lateral outer side surface cover part 33 is further provided with a bayonet 333 to be clamped into a periphery of the bump 1432 to enhance retaining force between the plug strengthener 30 and the plug guide part 14.

Figure 2:
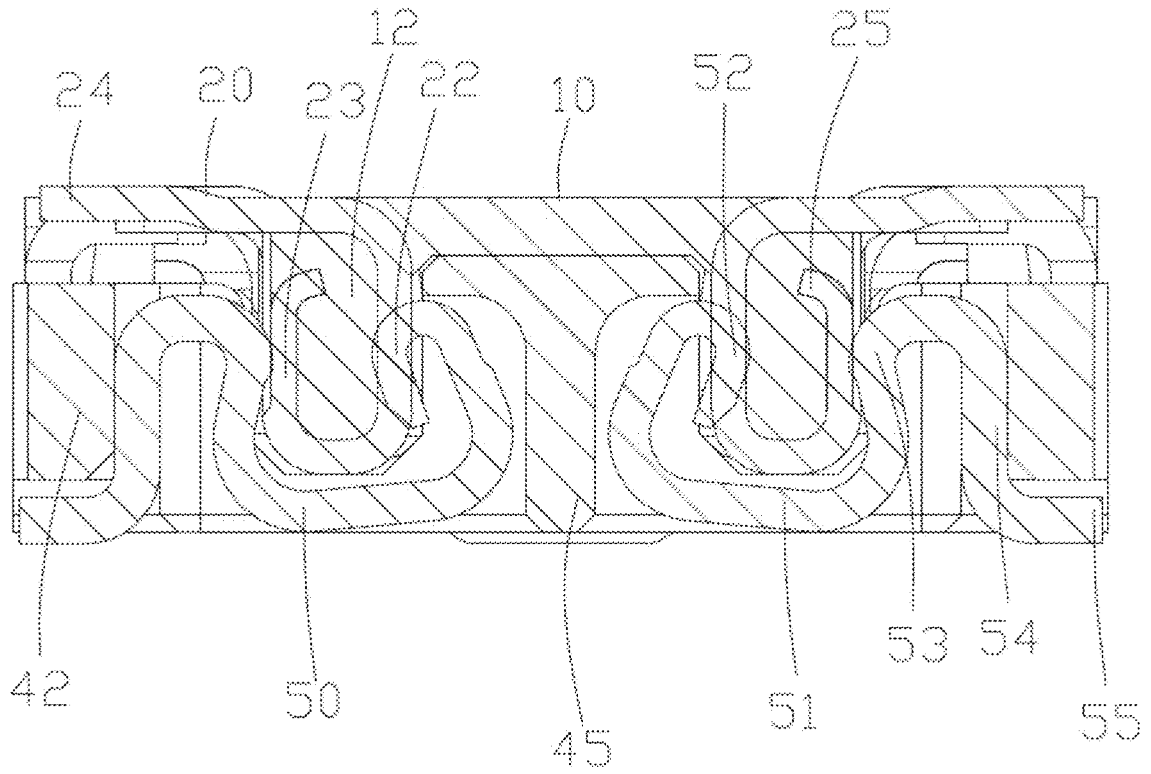
FIG. 2 is a sectional view taken along a dotted line A-A shown in FIG. 1.
Figure 3:
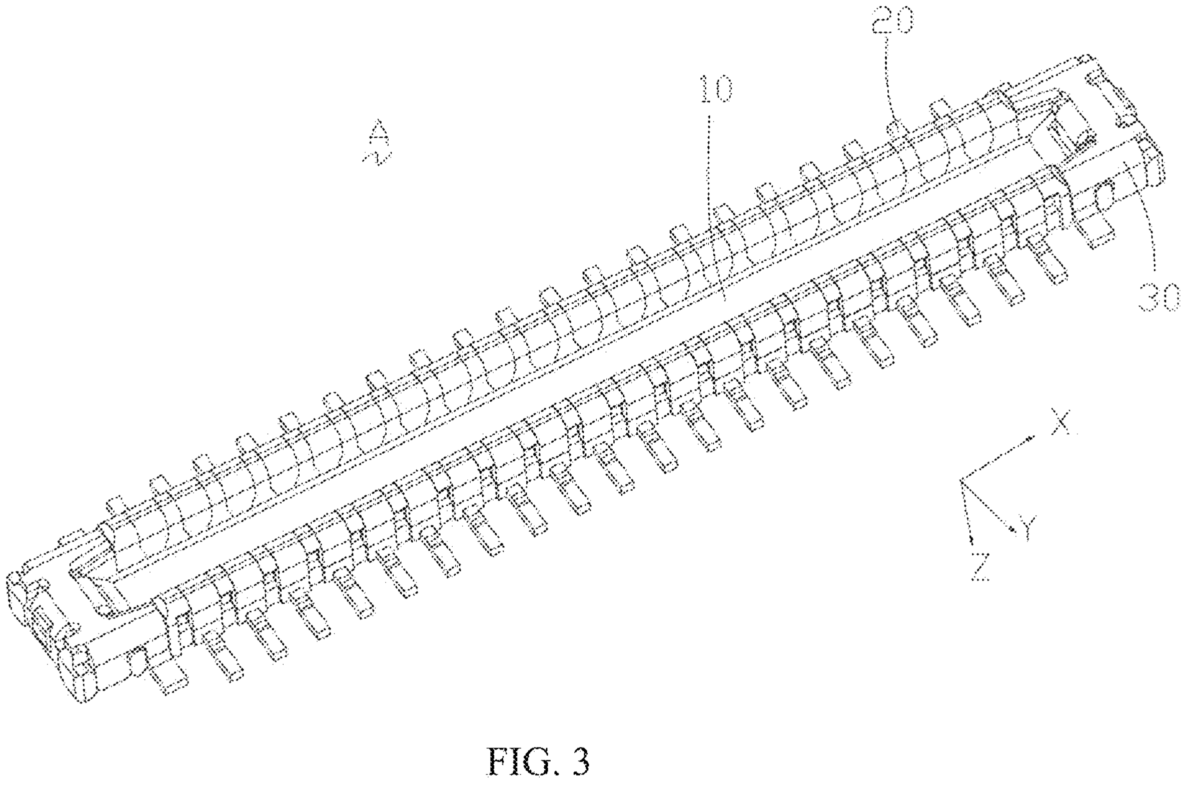
FIG. 3 is a three-dimensional assembled view of a board-to-board plug according to the present application.
Figure 4:
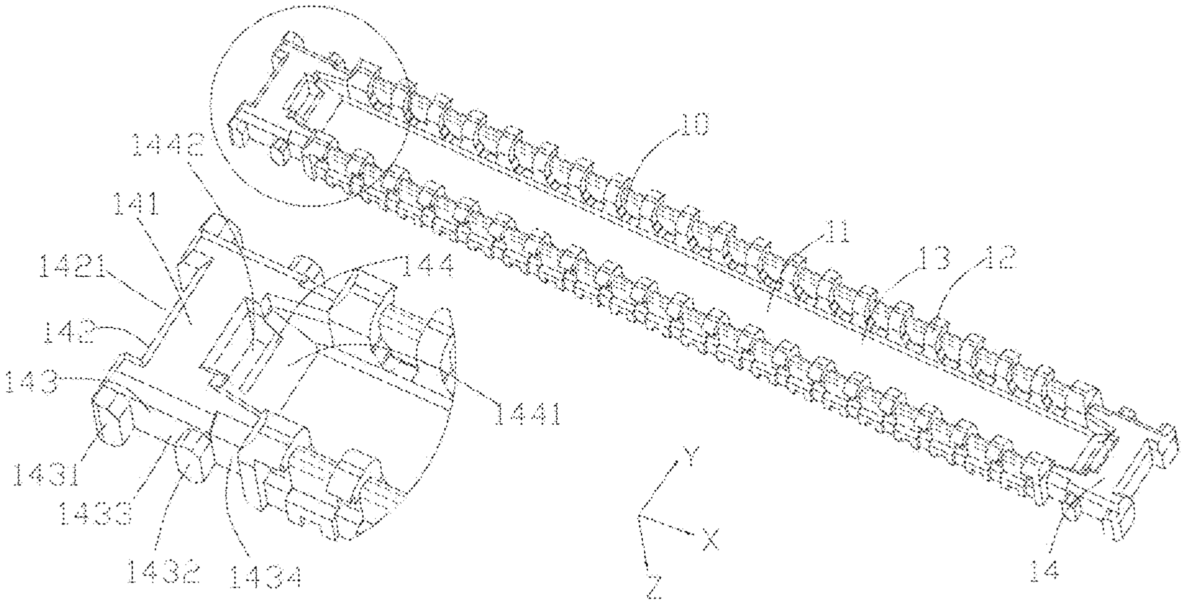
FIG. 4 is a three-dimensional view and a partial enlarged view of a plug body of the board-to-board plug according to the present application.
Figure 5:
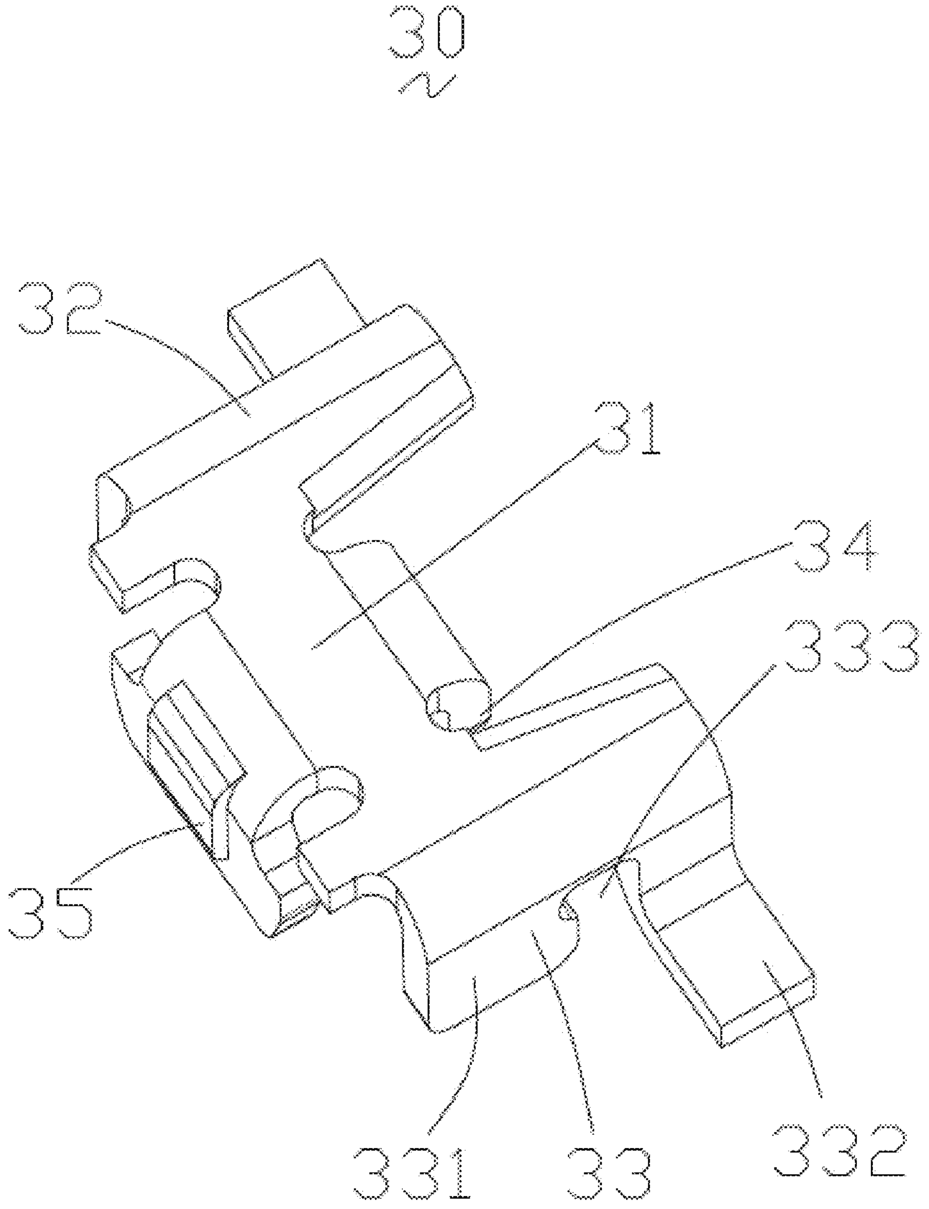
FIG. 5 is a three-dimensional view of a plug strengthener of the board-to-board plug according to the present application.
Figure 6:
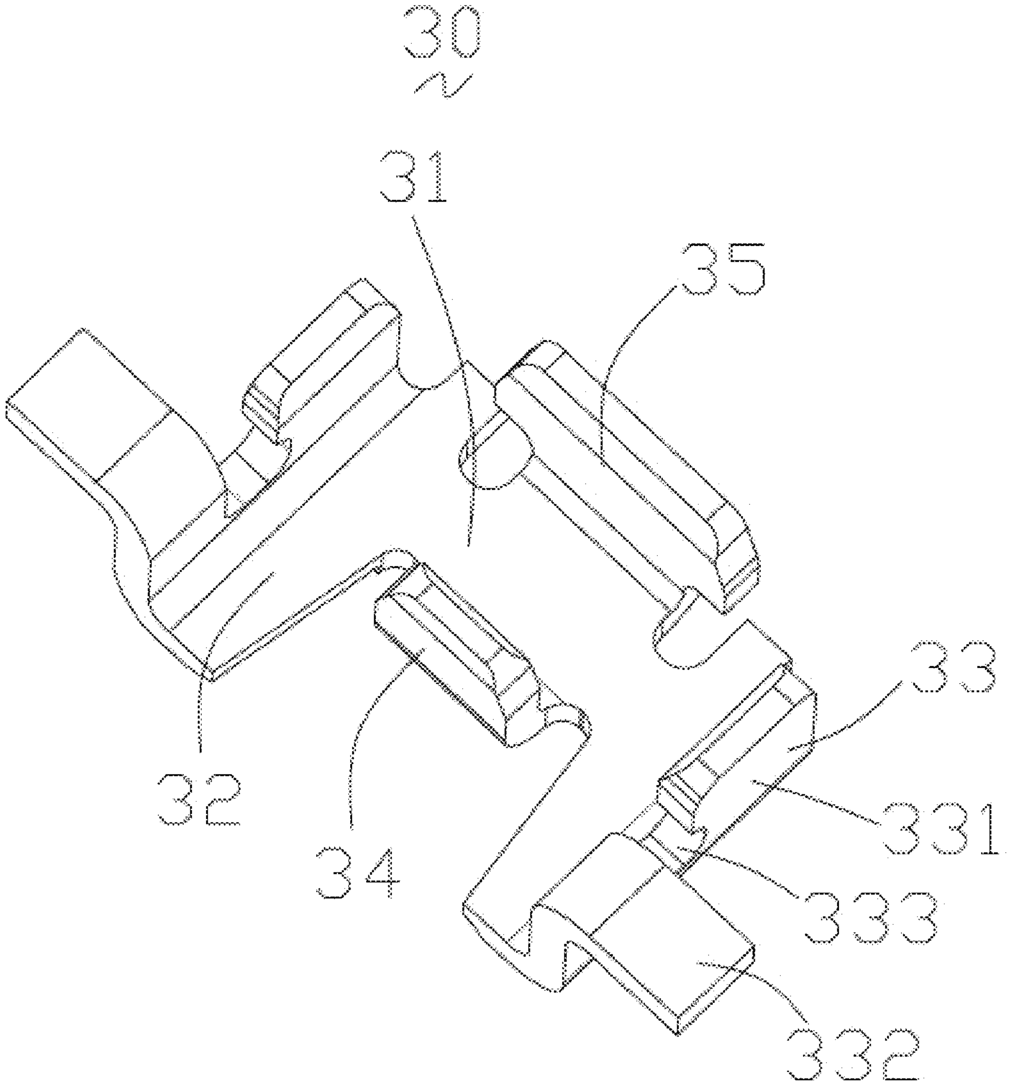
FIG. 6 is a three-dimensional view of the plug strengthener of the board-to-board plug according to the present application from another perspective.
Figure 7:
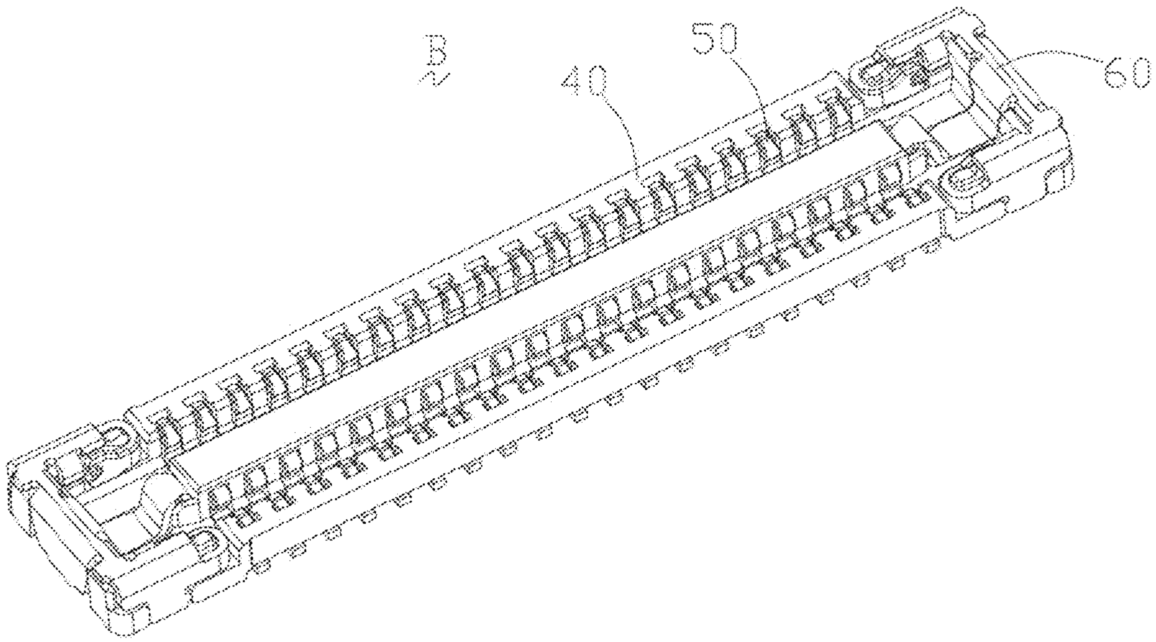
FIG. 7 is a three-dimensional assembled view of a board-to-board socket according to the present application.

Particularly referring to FIG. 2, the plug terminal 20 includes a plug terminal solder pin 24 extending longitudinally from an upper surface of the top wall 11 outside the top wall 11, a plug terminal first contact part 22 bending from the plug terminal solder pin 24 along a surface of the top wall 11 to an inner side surface of the plug side wall 12, and a plug terminal second contact part 23 bending and extending reversely from a lower end of the plug terminal first contact part 22 to an outer side surface of the plug side wall 12. The plug terminal second contact part 23 is provided with a recess structure. A free end of the plug terminal second contact part 23 bends toward the plug terminal first contact part 22 to form an embedded end part 25 embedded into the plug side wall 12. The embedded end part 25 can prevent separation of the plug terminal second contact part 23 from an outer side surface of the plug side wall 12.

Still referring to FIG. 1, FIG. 2, FIG. 7 and FIG. 8, the socket body 40 of the socket B of the board-to-board connector assembly according to the present application includes a bottom wall 41, a pair of socket side walls 42 formed by extending upward from two longitudinal sides of the bottom wall 41, an island part 45 formed by protruding upward from the bottom wall 41 and located between the pair of socket side walls 42, socket guide parts 44 formed at two lateral ends of the socket body 40, and a plug side wall receiving cavity 43 formed between the island part 45 and the pair of socket side walls 42.

The bottom wall of the socket body 40 is provided with several terminal slots 46 from bottom to top. The socket terminal 50 is assembled upward in the terminal slots 46. The socket terminal 50 includes a support arm part 51 extending into the terminal slot 46 at the bottom wall 41 and exposed to the bottom of the terminal slot 46, a socket terminal second contact part 52 formed by bending and extending upward from a longitudinal outer side of the support arm part 51 and located on a longitudinal side surface of the island part 45 and toward the socket side wall 42, a socket terminal first contact part 53 formed by bending upward from a longitudinal inner side of the support arm part 51 and located on a longitudinal side surface of the socket side wall 42, a retaining part 54 formed by bending and extending reversely from a top end of the first contact part 53, and a solder pin 55 bending vertically from a lower end of the retaining part 54 and extending longitudinally outward to a lower surface of the bottom wall 41 of the socket body 40.

When the plug A fits with the socket B, the island part 45 is received in the island part receiving cavity 13 of the plug A, the plug side wall 12 of the plug A is received in the plug side wall receiving cavity 43 of the socket B, and the plug guide part 14 is guided into the socket guide part 44. The plug terminal 20 is clamped between the socket terminal first and second contact parts 53 and 52 of the socket terminal 50. The first and second contact parts 22 and 23 of the plug terminal 20 are electrically contacted with the first and second contact parts 53 and 52 of the socket terminal 50 respectively.

Figure 8:
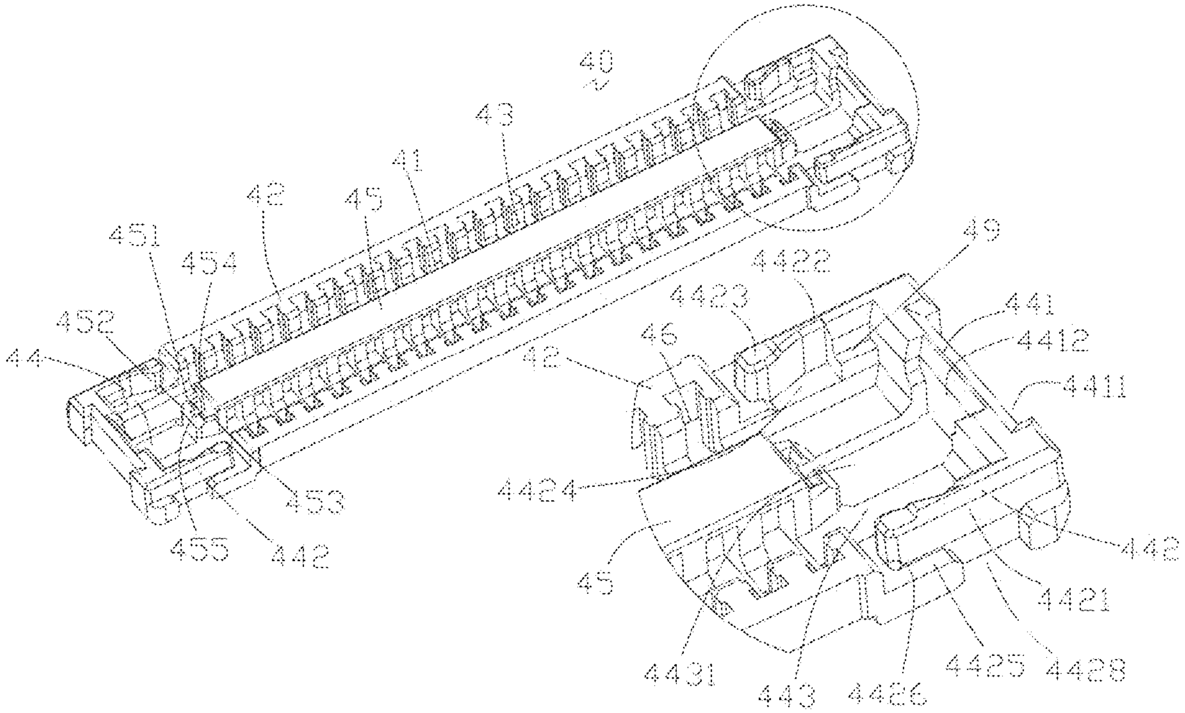
FIG. 8 is a three-dimensional view and a partial enlarged view of a socket body of the board-to-board socket according to the present application.

Particularly referring to FIG. 8, two lateral ends of the island part 45 are provided with protected parts 451 toward the socket guide parts 44. The protected part 451 includes a mesa part 453 whose horizontal plane is lower than the island part 45, a relief slope 452 formed by tilting diagonally downward from the mesa part 453, an engaging slot 454 recessed downward from the mesa part 453, and a communication notch 455 communicated with the relief slope 452 and arranged from the engaging slot 454 toward a lateral outer side.

The socket guide part 44 includes outer peripheral walls 441 and 442 and a plug guide part receiving cavity 443 located between the outer peripheral walls 441 and 442. The outer peripheral wall includes a longitudinal outer peripheral wall 441 and a pair of lateral outer peripheral walls 442 connected to two ends of the longitudinal outer peripheral wall 441. The lateral outer peripheral walls 442 are connected to the socket side walls 42.

A through opening 4431 running through in an up-down direction corresponding to lateral extension of the island part 45 is formed on the plug guide part receiving cavity 443. The through opening 4431 extends to a lower end of the longitudinal outer peripheral wall 441. First and second extending slots 4411 and 4412 are arranged at lateral outer and inner sides of the longitudinal outer peripheral wall 441 respectively. The second extending slot 4412 is communicated with the through opening 4431. The lateral outer peripheral wall 442 protrudes upward in the middle to form a support shoulder 4421. The periphery of the support shoulder 4421 is provided with a mounting step part 4425 located at a longitudinal outer side of the support shoulder 4421 and extending in the lateral direction, a communicating step part 4426 separating the support shoulder 4421 from the socket side wall 42, and an elastic relief part 4424 located at a longitudinal inner side of the support shoulder 4421 and extending in the lateral direction. The mounting step part 4425, the communicating step part 4426, and the elastic relief part 4424 are mutually communicated to form a U-shaped step part. The support shoulder 4421 includes a thin wall part 4422 adjacent to one side of the longitudinal outer peripheral wall 441 and a thick wall part 4423 formed by extending from the thin wall part 4422 along the lateral direction toward the socket side wall 42. Atop surface of the thick wall part 4423 is lower than that of the thin wall part 4422. A longitudinal width of the elastic relief part 4424 at the thin wall part 4422 is greater than that at the thick wall part 4423. That is, the thickness of the thin wall part 4422 is less than that of the thick wall part 4423, thereby increasing the longitudinal width of the elastic relief part 4424 at the thin wall part 4422. The side of the lateral outer peripheral wall 442 adjacent to the longitudinal outer peripheral wall 441 is provided with a stair part 49. The mounting step part 4425 partially runs vertically through to form a third extending slot 4428.

Figure 9:
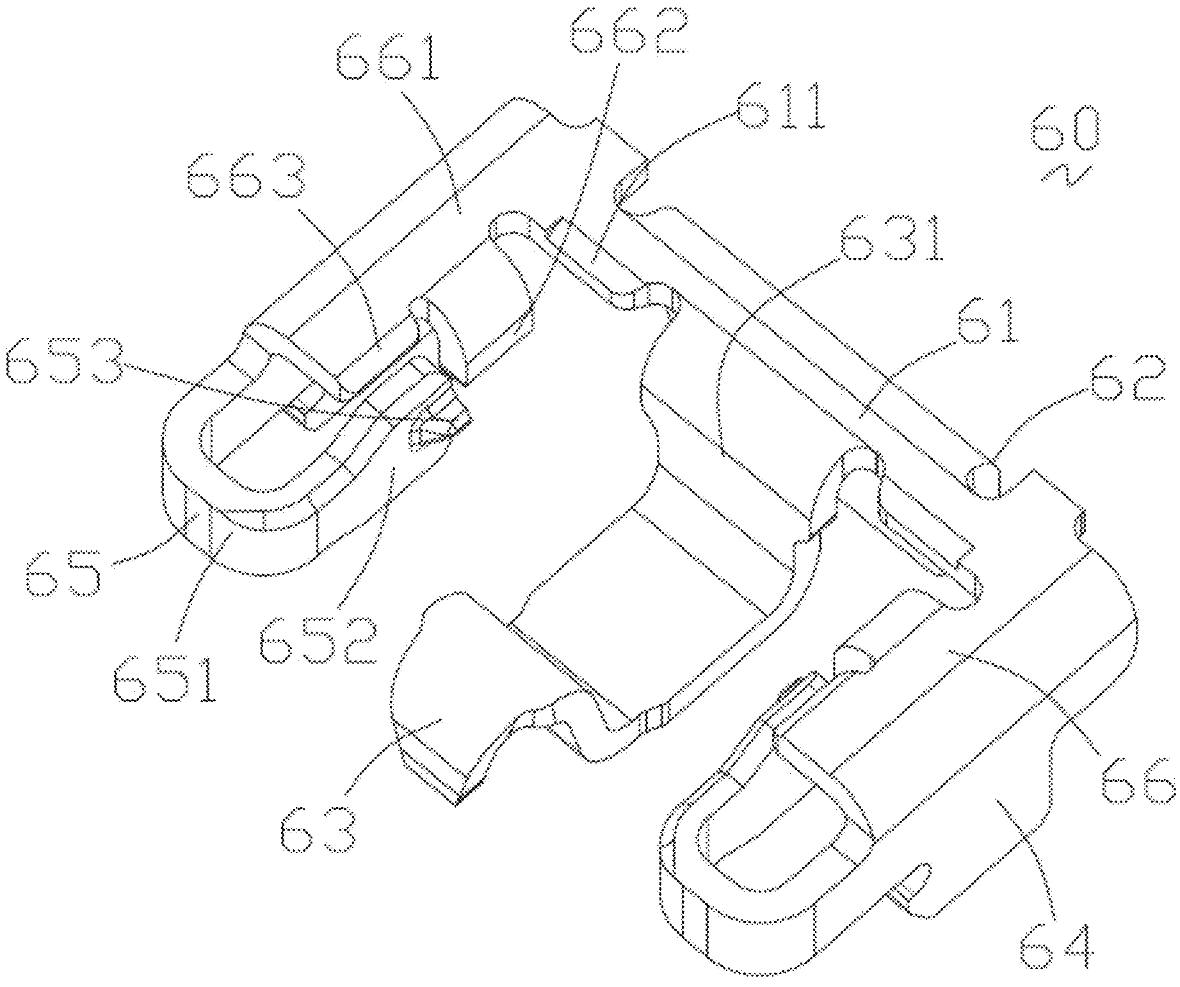
FIG. 9 is a three-dimensional view of a socket strengthener of the board-to-board socket according to the present application.
Figure 10:
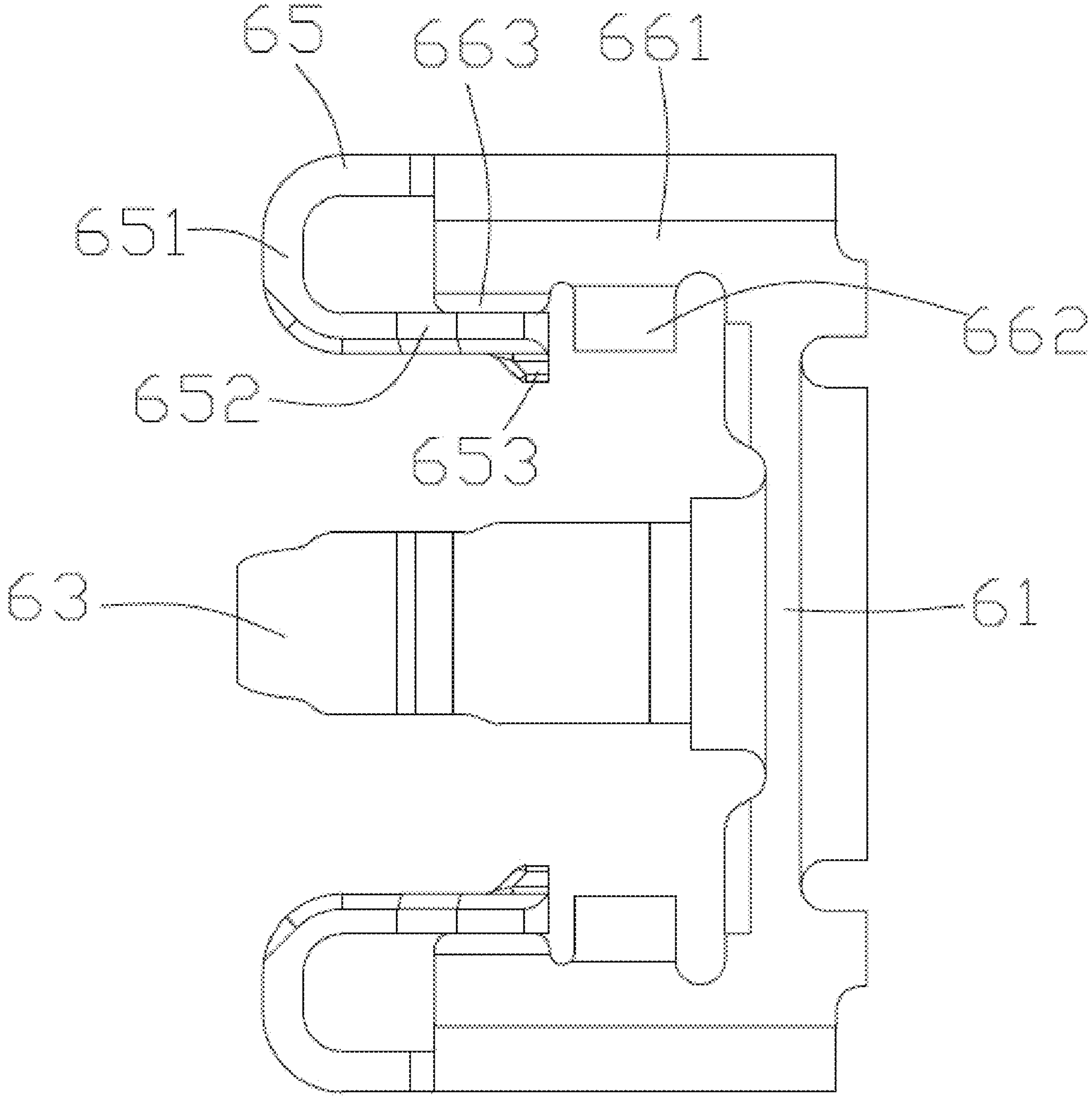
FIG. 10 is a top view of the socket strengthener of the board-to-board socket according to the present application.
Figure 11:
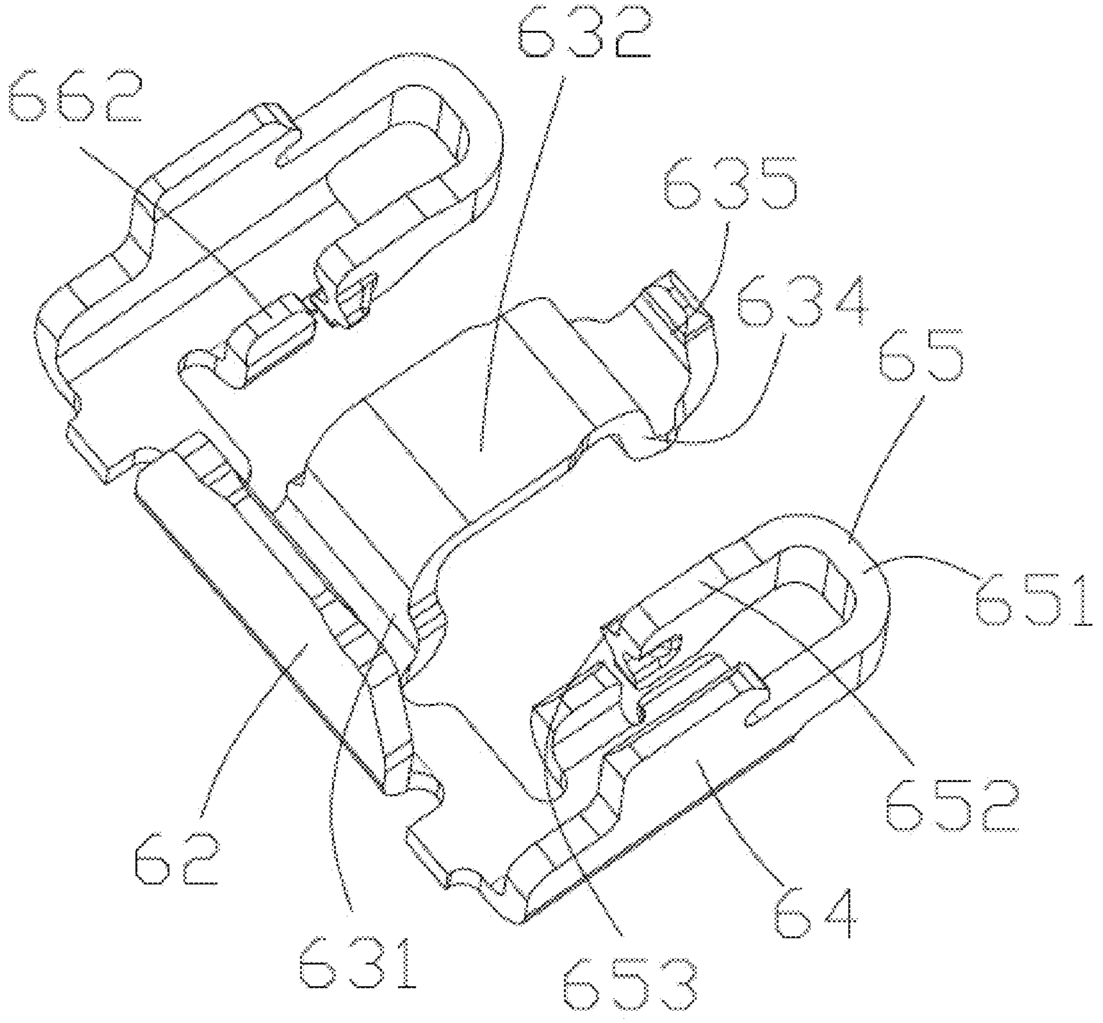
FIG. 11 is a three-dimensional view of the socket strengthener of the board-to-board socket according to the present application from another perspective.

Still referring to FIG. 9 to FIG. 11, the socket strengthener 60 includes a main body part 61 longitudinally covering a top surface of the longitudinal outer peripheral wall 441, a longitudinal outer peripheral wall cover part 62 bending and extending downward from a lateral outer end of the main body part 61 into the first extending slot 4411, a central guide part 63 bending downward from a lateral inner side of the main body part 61 and extending to the protected part 451 on a lateral end part of the island part 45, a top surface cover part 66 extending from two longitudinal ends of the main body part 61 to the top surface of the support shoulder 4421, a lateral outer peripheral wall cover part 64 formed by bending downward from longitudinal outer sides of the top surface cover part 66 and extending to the mounting step part 4425, and an elastic arm part 65 curving backwards from the free end of the lateral outer peripheral wall cover part 64 and extending to the elastic relief part 4424 through the communicating step part 4426.

In another embodiment, the elastic arm part 65 may also curve backwards from the lateral outer side of the lateral outer peripheral wall cover part 64 and extend to the elastic relief part 4424.

A free end 642 of the longitudinal outer peripheral wall cover part 62, as a solder pin, is fixed to the printed circuit board. A bottom end of the lateral outer peripheral wall cover part 64, as a solder pin, extends through the third extending slot 4428 to the printed circuit board for soldering and fixing. The side of the main body part 61 toward the plug guide part receiving cavity 443 bends downward at two longitudinal sides of the central guide part 63 to form a slope guide part 611.

The central guide part 63 includes a first central guide arm 631 formed by bending and extending downward from the lateral inner side of the main body part 61 into the second extending slot 4412, a support bottom arm 632 bending laterally from the bottom of the first central guide arm 631 and extending along the through opening 4431 to the bottoms of the protected parts 451 at the two sides of the island part 45, a second central guide arm 634 extending diagonally upward from the support bottom arm 632 above the protected part 451, and a snap-in end part 635 bending downward from a free end of the second central guide arm 634 and snapped into the engaging slot 454. The first and second central guide arms 631 and 634 are used to guide the insertion of the plug strengthener 30 and protect the longitudinal outer peripheral wall 441 of the socket body 40 and the protected parts 451 at the two lateral ends of the island part 45. The longitudinal outer side surface cover part 35 and the longitudinal inner side surface cover part 34 of the plug strengthener 30 are respectively guided by the first and second central guide arms 631 and 634 and enter between the first and second central guide arms 631 and 634 above the support bottom arm 632. However, in an insertion state, the longitudinal outer side surface cover part 35 and the longitudinal inner side surface cover part 34 are not in electrical contact with the first and second central guide arms 631 and 634. During the insertion, the support bottom arm 632 is compressed to generate supporting force with the printed circuit board attached thereto so that the first and second central guide arms 631 and 634 have certain elasticity.

The top surface cover part 66 includes a cover base part 661, a guide part 662 formed by curving downwards from the inner side of the cover base part 661 at the stair part 49, and a guide slope 663 formed by thinning inner edges of the cover base part 661 at the elastic relief part 4424. The top surface of the thick wall part 4423 of the support shoulder 4421 is not covered by the top surface cover part 66 and exposed to the outside. The bottom of the guide part 662 is located above the stair part 49.

The elastic arm parts 65 include tightening parts 651 formed by curving backwards from the free end of the lateral outer peripheral wall cover parts 64 in the lateral direction, elastic main arms 652 extending from the tightening parts 651 to the elastic relief part 4424 in the lateral direction, and contact convex parts 653 protruding from the elastic main arms 652 toward the plug guide part receiving cavities 443. The tightening parts 651 extend to the mounting step part 4425, the communicating step part 4426, and the elastic relief part 4424, that is, extends along the thick wall part 4423 of the support shoulder 4421. The elastic main arm 652 extends to the elastic relief part 4424 at the thin wall part 4422. The elastic relief part 4424 has more deformation space along the longitudinal direction at the position of the thin wall part 4422. The contact convex part 653 extends at least partially into the plug guide part receiving cavity 443. When the plug A is not inserted into the socket B, that is, the socket B is in a natural state, observed from top to bottom (i.e., shown in FIG. 11), the guide slopes 663 of the top surface cover parts 66 do not cover the elastic main arms 652. When the elastic arm parts 65 are extruded toward the longitudinal outer side by the contact part 331 of the lateral outer side surface cover part 33 of the plug strengthener 30, the elastic main arms 652 may be partially located below the guide slops 663.

In the natural state, the elastic main arms 652 are located on the side of the elastic relief part 4424 toward the plug guide part receiving cavity 443, and a deformation gap exists between the elastic main arms and the inner side surface of the thin wall part 4422. When the contact convex parts 653 of the elastic arm parts 65 are longitudinally extruded, the elastic main arm parts 652 deform in the deformation gap.

Figure 12:
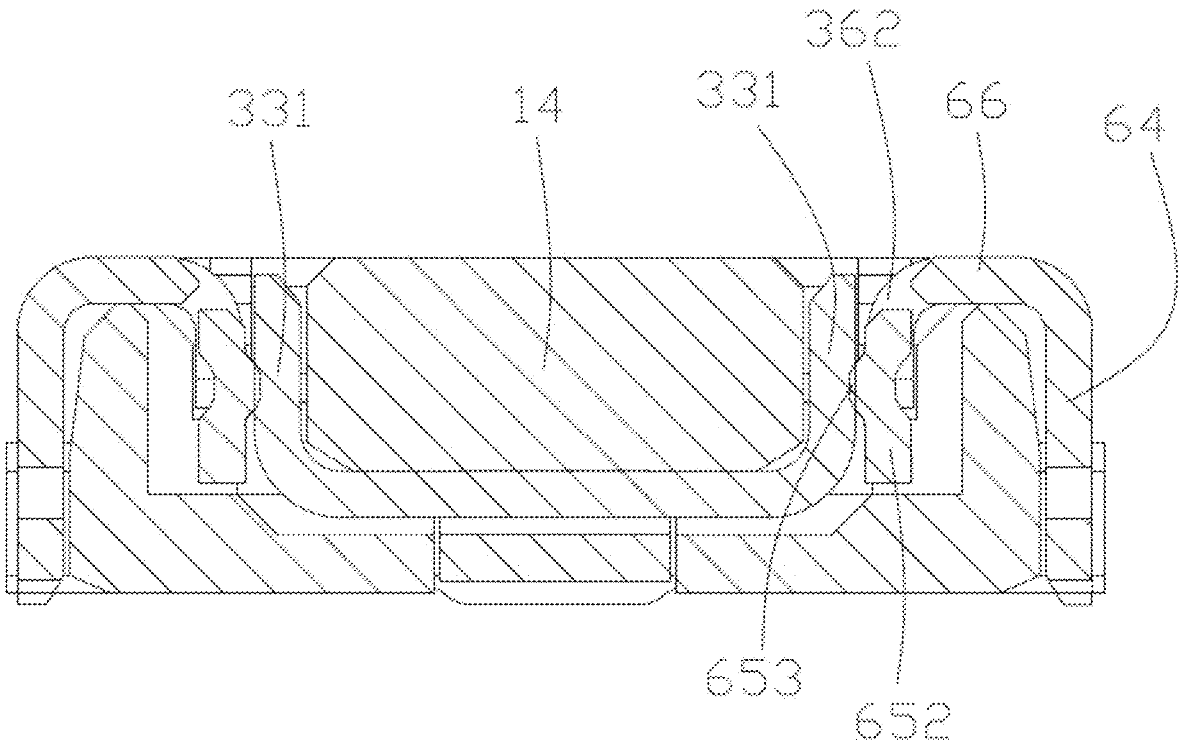
FIG. 12 is a sectional view taken along a dotted line B-B shown in FIG. 1.
Figure 13:
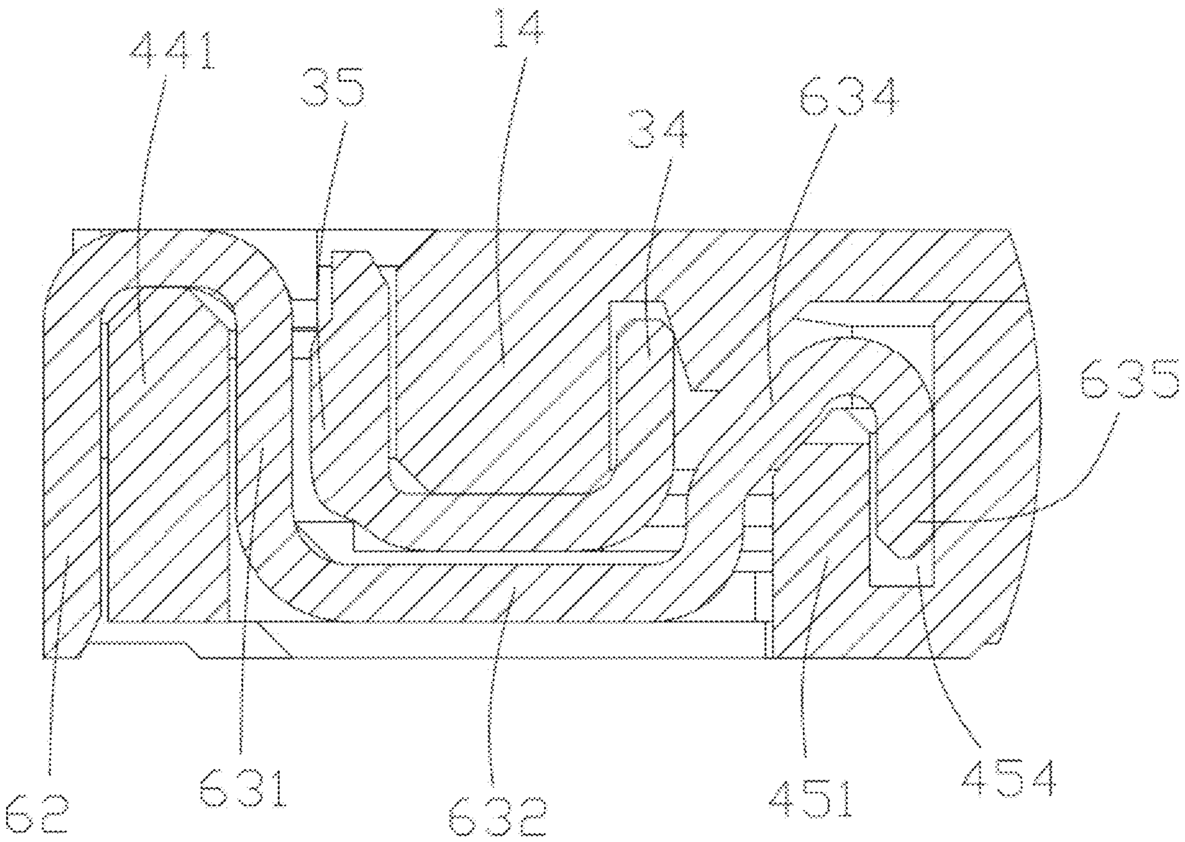
FIG. 13 is a partial sectional view of a dotted line C-C shown in FIG. 1.

Particularly referring to FIG. 12 and FIG. 13, when the plug A is inserted, the lateral outer side surface cover part 33 of the plug strengthener 30 first contacts the guide part 611, the guide part 662, and the guide slope 663 and is guided to be aligned with the plug guide part receiving cavity 443, and continues to press, the contact convex part 653 is electrically contacted with the contact part 331 of the plug strengthener 30 to transfer the current, and the elastic main arm 652 is extruded to deform toward the thin wall part 4422 and provides elastic force. The plug strengthener 30 and the socket strengthener 60 are electronically contacted with the two contact convex parts 653 through the two contact parts 331 in the longitudinal direction to transfer the current. A load to transfer the current may be up to 5 amperes.

According to the present application, guide parts 662 are formed by means of a bending downward on the lateral outer side of the top surface cover parts 66 of the socket strengthener 60, and elastic arm parts 65 are formed by means of a backwards bending of the free ends of the lateral outer peripheral wall cover parts 64. The elastic arm parts 65 and the guide parts 662 are displaced in lateral directions so as to increase the length by which the guide parts 662 extend downwards, causing the guide parts 662 to be able to protect the elastic main arm 652 throughout the entirety of an insertion process. Besides, the present application has advantages of a simple structure and good mass production.

The above are only embodiments of the present application and are not intended to limit the present application. The present application may be subject to various changes and variations for those skilled in the art. Any modification, equivalent replacement, improvement etc. made within the spirit and principle of the present application shall fall within the scope of claims of the present application.

What is claimed is:

1. A socket strengthener, comprising a main body part, top surface cover parts and lateral outer peripheral wall cover parts formed by extending from the main body part, and elastic arm parts curving backwards from free ends of the lateral outer peripheral wall cover parts in a lateral direction and extending to inner sides of the lateral outer peripheral wall cover parts, wherein the top surface cover parts, on a side adjacent to the elastic arm parts bend downward to form guide parts, and viewed from top to bottom the guide parts do not overlap with the elastic arm parts, and bottoms of the guide parts are lower than tops of the elastic arm parts.

2. The socket strengthener according to claim 1, wherein the top surface cover parts are thinned to form guide slopes at inner edges located on one side of the elastic arm parts, and the guide slopes are located obliquely above the elastic arm parts, and when a plug is not inserted into a socket, the guide slopes do not overlap with the elastic arm parts when observed from top to bottom.

3. The socket strengthener according to claim 2, wherein deformation gaps are formed between the elastic arm parts and the lateral outer peripheral wall cover parts, such that the elastic arm parts elastically deform toward the lateral outer peripheral wall cover parts when subjected to longitudinally outward pressure.

4. The socket strengthener according to claim 3, wherein the elastic arm parts comprise:

tightening parts formed by curving backwards from lateral ends of the lateral outer peripheral wall cover parts, elastic main arms formed by extending from the tightening parts in the lateral direction, and contact convex parts formed by stamping on the elastic main arms, wherein when observed from top to bottom, the guide slopes do not overlap with the elastic main arms.

5. The socket strengthener according to claim 4, wherein the lateral outer peripheral wall cover parts are formed by curving downwards and extending from outer sides of the top surface cover parts; bottoms of the lateral outer peripheral wall cover parts are fixed, as solder pins, to a printed circuit board; and a current is transferred from the contact convex parts, the elastic arm parts, and the lateral outer peripheral wall cover parts to the printed circuit board.

6. A board-to-board socket, comprising a socket body, a socket terminal, and a socket strengthener, wherein the socket body comprises a bottom wall, socket side walls formed by protruding upward from two longitudinal ends of the bottom wall, socket guide parts formed at two lateral ends of the socket body, and an island part formed by protruding upward from the bottom wall, wherein each of the socket guide parts comprises a plug guide part receiving cavity, a longitudinal outer peripheral wall located at a lateral outer side of the plug guide part receiving cavity, and a pair of lateral outer peripheral walls located at two longitudinal sides of the plug guide part receiving cavity, and the socket strengthener comprises a main body part covering a surface of the longitudinal outer peripheral wall, top surface cover parts and lateral outer peripheral wall cover parts extending from the main body part and covering top surfaces and outer side surfaces of the pair of lateral outer peripheral walls, and elastic arm parts curving backwards from free ends of the lateral outer peripheral wall cover parts in a lateral direction and extending from the lateral outer peripheral wall cover parts to sides of the pair of lateral outer peripheral walls adjacent to the plug guide part receiving cavity, and wherein the top surface cover parts, at an inner side adjacent to the pair of lateral outer peripheral walls, bend downward to form guide parts; and viewed from top to bottom, the guide parts do not overlap with the elastic arm parts, and bottoms of the guide parts are lower than tops of the elastic arm parts.

7. The board-to-board socket according to claim 6, wherein the top surface cover parts are thinned to form guide slopes at inner edges located on one side of the elastic arm parts, and when a plug is not inserted into a socket, the guide slopes do not overlap with the elastic arm parts when observed from top to bottom.

8. The board-to-board socket according to claim 7, wherein each of the pair of lateral outer peripheral walls of the socket body comprises a support shoulder and an elastic relief part located at a longitudinal inner side of the support shoulder and communicates with the plug guide part receiving cavity, and the elastic arm parts are elastically deformable in a longitudinal direction at the elastic relief part.

9. The board-to-board socket according to claim 8, wherein the support shoulder comprises a thin wall part located at a lateral outer side and a thick wall part located at a lateral inner side, the elastic relief part has a large width in the longitudinal direction at the thin wall part, and a thickness of the thin wall part is less than that of the thick wall part, and the elastic arm parts are elastically deformed along the longitudinal direction toward an inner side surface of the thin wall part under extrusion of the plug, and a top surface of the thin wall part is covered by the top surface cover parts, a horizontal position of a top surface of the thick wall part is lower than that of a top surface of the thin wall part, and the top surface of the thin wall part is not covered by the top surface cover parts.

10. The board-to-board socket according to claim 9, wherein a mounting step part is formed at a longitudinal outer side of the support shoulder, each of the lateral outer peripheral wall cover parts extends to the mounting step part, and a communicating step part communicates with the elastic relief part and the mounting step part is formed on at least one end of the support shoulder in the lateral direction.

11. The board-to-board socket according to claim 10, wherein the elastic arm parts comprise tightening parts formed by curving backwards from lateral ends of the lateral outer peripheral wall cover parts and extending to the communicating step part, elastic main arms extending from the tightening parts to the elastic relief part in the lateral direction, and contact convex parts formed by stamping on the elastic main arms and protruding into the plug guide part receiving cavity.

12. The board-to-board socket according to claim 11, wherein the elastic main arms and the contact convex parts thereon correspond to the thin wall part of the elastic relief part, the tightening parts surround a periphery of the thick wall part, the top surface cover parts are thinned to form guide slopes at inner edges at a position of the elastic main arms, and when observed from top to bottom, the guide slopes do not overlap with the elastic main arms.

13. The board-to-board socket according to claim 12, wherein the lateral outer peripheral wall cover parts are formed by curving downwards and extending from outer sides of the top surface cover parts, bottoms of the lateral outer peripheral wall cover parts are fixed, as solder pins, to a printed circuit board, and a current is transferred from the contact convex parts, the elastic arm parts, and the lateral outer peripheral wall cover parts to the printed circuit board.

14. The board-to-board socket according to claim 13, wherein the socket strengthener further comprises:

longitudinal outer peripheral wall cover parts formed by curving downwards and extending from a lateral outer side of the main body part, and a central guide part curving downwards from a lateral inner side of the main body part and extending to a lateral outer end of the island part.

15. The board-to-board socket according to claim 14, wherein the main body part is thinned at two longitudinal sides of the central guide part to form a slope guide part, an inner side of the lateral outer peripheral wall is provided with a stair part on a lateral outer side of the support shoulder, and a bottom surface of the guide part is located above the stair part.

16. A board-to-board connector assembly, comprising a socket and a plug matched therewith, wherein the plug comprises a plug body, a plug terminal, and a plug strengthener, and the plug body comprises a top wall, plug side walls formed by extending downwards from two longitudinal sides of the top wall, plug guide parts formed at two lateral ends of the plug body, and an island part receiving cavity located between the plug side walls and the plug guide parts, the socket comprises a socket body, a socket terminal, and a socket strengthener, the socket body comprises a bottom wall, socket side walls formed by protruding upward from two longitudinal ends of the bottom wall, socket guide parts formed at two lateral ends of the socket body, an island part formed by protruding upward from the bottom wall, and a plug side wall receiving cavity formed between the island part and the socket side walls, each of the socket guide parts comprises a plug guide part receiving cavity, a longitudinal outer peripheral wall located at a lateral outer side of the plug guide part receiving cavity, and a pair of lateral outer peripheral walls located at two longitudinal sides of the plug guide part receiving cavity, the socket strengthener comprises a main body part covering a surface of the longitudinal outer peripheral wall, top surface cover parts and lateral outer peripheral wall cover parts extending from the main body part and covering top surfaces and outer side surfaces of the pair of lateral outer peripheral walls, and elastic arm parts curving backwards from free ends of the lateral outer peripheral wall cover parts in a lateral direction and extending from the lateral outer peripheral wall cover parts to sides of the pair of lateral outer peripheral walls adjacent to the plug guide part receiving cavity, wherein the top surface cover parts, at an inner side adjacent to the pair of lateral outer peripheral walls, bend downward to form guide parts, and viewed from top to bottom, the guide parts do not overlap with the elastic arm parts, and bottoms of the guide parts are lower than tops of the elastic arm parts.

17. The board-to-board connector assembly according to claim 16, wherein the top surface cover parts are thinned to form guide slopes at inner edges located on one side of the elastic arm parts, and when the plug is not inserted into a socket, the guide slopes do not overlap with the elastic arm parts when observed from top to bottom.

18. The board-to-board connector assembly according to claim 17, wherein each of the pair of lateral outer peripheral walls of the socket body comprises a support shoulder and an elastic relief part located at a longitudinal inner side of the support shoulder, and communicates with the plug guide part receiving cavity, and the elastic arm parts are elastically deformable in a longitudinal direction at the elastic relief part.

19. The board-to-board connector assembly according to claim 18, wherein the support shoulder comprises a thin wall part located at a lateral outer side and a thick wall part located a lateral inner side, the elastic relief part has a large width in the longitudinal direction at the thin wall part, a thickness of the thin wall part is less than that of the thick wall part, and the elastic arm parts are elastically deformed along the longitudinal direction toward an inner side surface of the thin wall part under extrusion of the plug;

a top surface of the thin wall part is covered by the top surface cover part, a horizontal position of the top surface of the thick wall part is lower than that of the top surface of the thin wall part, the top surface of the thin wall part is not covered by the top surface cover part, a mounting step part is formed at a longitudinal outer side of the support shoulder, each of the pair of lateral outer peripheral wall cover parts extends to the mounting step part, and a communicating step part communicates with the elastic relief part and the mounting step part is formed on at least one end of the support shoulder in the lateral direction.

20. The board-to-board connector assembly according to claim 19, wherein the elastic arm parts comprise tightening parts formed by curving from lateral ends of the lateral outer peripheral wall cover parts and extending to the communicating step part, elastic main arms extending from the tightening parts to the elastic relief part in the lateral direction, and contact convex parts formed by stamping on the elastic main arms and protruding into the plug guide receiving cavity, wherein the elastic main arms and the contact convex parts thereon correspond to the thin wall part of the elastic relief part, the tightening parts surround a periphery of the thick wall part, the top surface cover parts are thinned to form the guide slopes at inner edges at the position of the elastic main arms, and when observed from top to bottom, the guide slopes do not overlap with the elastic main arms.

* * * * *